Feb. 16, 1926.
Re. 16,263
E. G. ROBESON
TYPE BAR
Original Filed August 28, 1922
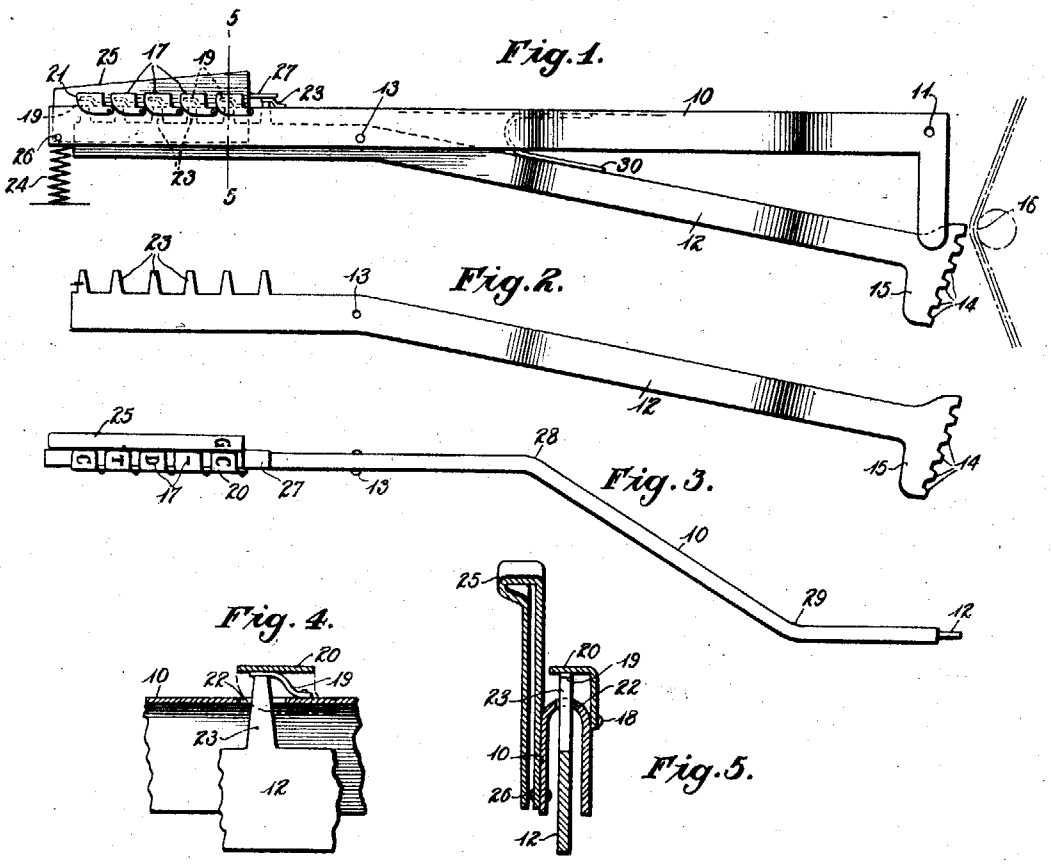
Inventor
Edna G. Robeson
By Brown & Phelps
Attorneys Reissued Feb. 16, 1926. Re. 16,263

UNITED STATES PATENT OFFICE.

EDNA G. ROBESON, OF ATLANTA, GEORGIA, ASSIGNOR TO ATLANTA MODEL MACHINE COMPANY, A CORPORATION OF GEORGIA.

TYPE BAR.

Original No. 1,454,692, dated May 8, 1923, Serial No. 584,699, filed August 28, 1922. Application for reissue filed April 25, 1925. Serial No. 25,924.

*To all whom it may concern:*

Be it known that I, EDNA G. ROBESON, a citizen of the United States, residing at Atlanta, in the county of Fulton and State of Georgia, have invented certain new and useful Improvements in Type Bars, of which the following is a specification.

The invention relates to typewriters, and has as an object the provision of a type bar bearing a plurality of type and a plurality of keys, each of which may operate its corresponding type. A further object of the invention is the provision of a type bar having a guide to enable the finger of the user to be positioned without use of the eyes.

An illustrative embodiment of the invention is shown in the accompanying drawing, in which—

Fig. 1 is a side view of a single bar;

Fig. 2 is a detail side view of an element of the bar, and

Fig. 3 is a plan view of the structure shown in Fig. 1;

Fig. 4 is a detail vertical longitudinal section on an enlarged scale, and

Fig. 5 is a detail vertical transverse section on line 5—5 of Fig. 1.

In the stenographic typewriter it is desirable to have only ten keys on the machine that one key may be operated by each finger or thumb. However, the provision of ten letters is not sufficient. The present invention provides a plurality of characters upon each type bar, each character operable by the pressing of the corresponding key. To this end there is shown in the drawings a bar 10, pivoted at 11, and a second bar 12 pivoted upon the bar 10, as at 13. The bar 12 will be referred to as a type bar.

A plurality of type 14 are shown as mounted upon the vertical elongated end 15 of the type bar 12. If the bar 10 be moved about the pivot 11, the type 14 which is brought to the printing line opposite the center of a roll 16 bearing paper, shown in dotted lines, will be pressed toward the paper and an impression made, an inked ribbon being interposed between the type and the paper.

To move the bar 12 about the pivot 13 a plurality of keys 17 are provided, each pivoted upon a pin 18 upon the bar 10. To hold the keys in normal position a relatively light spring 19 is secured to the upper portion of the bar 10 and extends under the horizontal portion 20 of each key. The means for moving the part 12 may be omitted from the end key 21 since the type 14 corresponding to said key is normally placed upon the printing line. However, this key is provided with a spring 19 so that the feel of the key and its yielding may be exactly the same as is the case with the other keys 17.

Projecting from the bar 12 through openings 22 in the bar 10 there are shown pins 23, preferably formed integral with the bar 12. As shown the pins 23 lie directly under portion 20 of each key. The spring 19 may be interposed between the top of the pins 23 and the horizontal portion 20 of the key if desired.

To hold the bar 10 in its normal position a relatively stiff spring 24 may be placed under the end of the bar and seated upon any desirable base. Upon the first pressure of the key 17 or 21 the relatively light spring 19 will be overcome, and in the case of keys 17 the type bar 12 will be actuated. After the key has been depressed to the limit of its motion additional pressure will compress the spring 24 with movement of the bar 12 and the bar 10 acting as a unit about the pivot 11. Dependent upon the distance of the key 17 from the pivot 13 the end 15 of the bar 12 will be moved a varying distance which will be the correct distance to raise the type corresponding to the key depressed to the printing line before the movement about the pivot 11 takes place.

It is desirable to have some means to preserve contact of the finger of the user with the row of keys. To this end there is provided a plate-like member 25, shown as pivoted at 26 upon the bar 10, and as having a projecting portion 27 overlying the last projection 23 upon the type bar 12, thereby acting as a key. It is preferred to place a letter which is used with more frequency than are the letters upon the other keys 17 upon the member 25, or upon the plate 27, since the finger can be lifted to the top of the member 25, at any position upon the row of keys, and thereby cause the character corresponding to the key 27 to be actuated with a minimum of movement of the finger.

The bars as shown in Fig. 3 may be bent into an angle, as at 28 and 29, which angles may vary according to the necessity of placing a bar in a machine with other like keys, which vary from that shown merely by the characters chosen and by the angles, which will depend upon the position of the key in the machine.

It will be seen that the type desired may be actuated in the most simple manner by a simple pressure thereon, the act of selecting the type and making the impression being entirely automatic without any care on the part of the operator as to the nature of the pressure applied or as to any other feature than the placing of the fingers upon the correct key.

The type bar 12 may be returned to normal by gravity after each actuation or a light spring 30 may be interposed between the bars 10 and 12 for the purpose.

Minor changes may be made in the physical embodiment of the invention without departing from the spirit thereof.

I claim:

1. A type bar comprising, in combination, a bar supporting member, a type bar supported thereon, a plurality of type mounted on said type bar, selective means upon said member to move said type bar to bring a desired type to a printing position, means whereby continued movement of said selective means moves said type to make an impression, and means to prevent the impression making portion of said movement during the selecting portion thereof.

2. A type bar comprising, in combination, a bar supporting member, a type bar supported thereon, a plurality of type mounted on said bar, selective means upon said member to move said type bar to bring a desired type to printing position by initial movement, means whereby continued movement of said selective means moves said supporting member and said type bar to make an impression, and means to prevent the impression making portion of said movement during the selecting portion thereof.

3. A type bar comprising, in combination, a horizontal bar supporting member pivoted adjacent its forward end, a type bar pivoted upon said member with its forward end depending below said first named pivot, a plurality of type carried by the forward end of said bar, a plurality of selective means carried by said member at different distances from the pivot of said bar adapted upon initial movement to actuate said bar and upon continued movement to actuate both said bar and member about said first named pivot to make an impression of the chosen type.

4. A type bar comprising, in combination, a bar supporting member pivoted adjacent its forward end, a type bar pivoted upon said member with its forward end below said pivot, a plurality of type carried by the forward end of said bar at different distances below said first named pivot, a plurality of selective actuating means at different distances from the pivot of said type bar coacting with the portion of the bar opposite that carrying said type whereby equal movement of said means will bring the respective type to printing position at will, and additional movement of said means will cause said type to make a printing movement.

5. A type bar comprising, in combination, a bar supporting member pivoted adjacent its forward end, a type bar pivoted between its ends upon said member, a plurality of type carried by an end of said bar at varying distances below said first named pivot, a plurality of selective actuating means coacting with the portion of said bar separated from said type by and spaced varying distances from said second named pivot, whereby equal movement of said means may bring the corresponding type to a printing line, a spring supporting the free end of said member adapted to resist the selecting movement of said means but to yield to continued greater pressure to cause the chosen type to make an impression.

6. A type bar comprising, in combination, a supporting member, a type bar supported thereon, a plurality of type mounted on said bar, a plurality of selective means carried by said member, a key-member projecting above the plane of said selective means and having pivotal connection with said member.

7. A type bar comprising, in combination, a bar supporting member, a type bar member movably supported thereon, a plurality of type mounted on said type bar, selective means upon one of said members mounted for movement relatively thereto to move said type bar to bring a desired type to a printing position, means whereby continued movement of said selective means moves said type to make an impression, and means to prevent the impression making portion of said movement during the selecting portion thereof.

8. In a device of the class described, in combination, a movable pivot, a bar mounted on said pivot, a plurality of record forming means selectively actuated by said bar to recording position and actuated to form a record by movement of said pivot, a plurality of keys mounted at one side of and at different distances from said pivot actuating said bar differing amounts in proportion to the distance from said pivot, and means whereby movement of a chosen key first moves said bar about its pivot to select a record forming means and then move said pivot whereby to produce a record.

EDNA G. ROBESON.